United States Patent [19]

Sato et al.

[11] Patent Number: 4,911,864
[45] Date of Patent: Mar. 27, 1990

[54] CURABLE COMPOSITIONS

[75] Inventors: Hisatake Sato, Yokohama; Akinori Suzuki, Kawasaki, both of Japan

[73] Assignee: Nippon Oil Co., Ltd., Japan

[21] Appl. No.: 162,895

[22] Filed: Mar. 2, 1988

[30] Foreign Application Priority Data

Mar. 4, 1987 [JP] Japan .................................. 62-49134

[51] Int. Cl.⁴ ............................................... H01B 1/06
[52] U.S. Cl. ...................... 252/518; 252/500
[58] Field of Search ............. 252/500, 518, 520, 501.1

[56] References Cited

U.S. PATENT DOCUMENTS 4,431,764 2/1984 Yoshizumi ........................ 252/518

FOREIGN PATENT DOCUMENTS 57-85866 5/1982 Japan .
60-99176 6/1985 Japan .
60-219270 11/1985 Japan .

Primary Examiner—Josephine Barr
Attorney, Agent, or Firm—Bruce L. Adams; Van C. Wilks

[57] ABSTRACT

Curable compositions essentially comprise a selected class of starting compounds and a selected class of particulate metallic oxides as electrically conductive components, the oxides being coated with a selected class of hydrolyzed silicon compounds of the formula

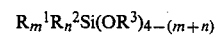

$$R_m^1 R_n^2 Si(OR^3)_{4-(m+n)}$$

where $R^1$ and $R^2$ each are a hydrocarbon moiety of 1 to 20 carbon atoms or an organic group containing a halogen atom or an epoxy, acrylonitrile, methacrylonitrile, mercapto or amino group, each of the hydrocarbon moiety and organic group forming a Si-C bond, $R^3$ is a hydrocarbon moiety of 1 to 6 carbon atoms or an oxygen-containing hydrocarbon moiety, m and n each are 0, 1 or 2, and the sum of m and n is 1 or 2. The resulting cured coating excels in transparency, abrasion resistance, adhesive strength and electrical conductivity.

10 Claims, No Drawings

CURABLE COMPOSITIONS

BACKGROUND OF THE INVENTION

1. Field of the Invention

This invention relates to curable compositions suitable for use as transparent, electrically conductive coatings.

2. Description of the Prior Art

Destaticization is generally required of semiconducting wafer vessels and electronic and electrical appliances. To this end, antistatic coatings are known which contain particulate carbon or metal. Alternatively, carbon particle- or metallic fiber-filled resins have been proposed for use as integrally destaticizable materials. These prior materials are not wholly satisfactory as the resulting coats and moldings are opaquely colorable.

Japanese Patent Laid-Open Publication No. 57-85866 discloses a coating composition in which particulate tin oxide is combined as an electrically conductive componentwith a binder. This coat, though transparent and antistatic, is susceptible to abrasive wear and also to solvent attack because the binder is thermoplastic in nature.

In Japanese Patent Laid-Open Publication No. 60-99176, a certain compound is used as a coating binder, which compound is derived by combining electrically conductive tin oxide-based particles with an acryloyl or methacryloyl group-containing oligomer and a maleic anhydride-added isoprene polymer, followed by partial esterification. A further coating composition involves the use of binders made up of tin oxide comminuted and an oligomeric or monomeric material having in the molecule one or more radical-reactive unsaturated groups and one or more hydroxyl groups as taught in Japanese Patent Laid-Open Publication No. 60-219270. Such known coatings excel in ultraviolet curing, electrical conductivity, hardness and solvent resistance, but fail to give sufficient transparency and adequate abrasion resistance. Tin oxide comminuted, because of its greater specific gravity than organic binders, is difficult to homogenize, and if not impossible, is liable to precipitate.

SUMMARY OF THE INVENTION

It is therefore the primary object of the present invention to provide an improved curable composition which is satisfactorily transparent, greatly abrasion-resistant, sufficiently adhesive and highly electrically-conductive.

The composition according to the invention is particularly suitable for areas of application which require immunity from scarring, dusting and static electricity and which include vessels for semiconducting wafers, screens for television receivers, organic window panes, covers for lighting fittings and the like.

To attain this and other objects and advantages of the invention, as will be better understood from the following description, a curable composition comprises (a) a base compound having at least two acryloyl or methacryloyl groups, and (b) a particulate electrically-conductive component selected from the group consisting of tin oxide, indium oxide and compounds composed predominantly of at least one of the oxides, the component having carried or coated thereon a hydrolyzed silicon compound of the formula $$R_m^1 R_n^2 Si(OR^3)_{4-(m+n)}$$

where $R^1$ and $R^2$ each are a hydrocarbon moiety of 1 to 20 carbon atoms or an organic group containing a halogen atom or an epoxy, acrylonitrile, methacrylonitrile, mercapto or amino group, each of the hydrocarbon moiety and organic group forming a Si-C bond, $R^3$ is a hydrocarbon moiety of 1 to 6 carbon atoms or an oxygen-containing hydrocarbon moiety, m and n each are 0, 1 or 2, and the sum of m and n is 1 or 2.

DESCRIPTION OF THE PREFERRED EMBODIMENTS

Base compounds (a) useful for the purpose of the present invention are compounds having two or more acryloyl or methacryloyl groups chemically bonded and having a carbon number of 8 to 30. Specific examples include bifunctional acrylates and methacrylates such as ethyleneglycol diacrylate, propyleneglycol diacrylate, propyleneglycol dimethacrylate, tetraethyleneglycol dimethacrylate and the like, and trifunctional and multifunctional acrylates and methacrylates such as trimethylolpropane triacrylate, trimethylolpropane trimethacrylate, glycerol triacrylate, glycerol trimethacrylate, pentaerythritol triacrylate, pentaerythritol trimethacrylate, tris(2-hydroxyethyl)isocyanurate acrylate, tris(2-hydroxyethyl)isocyanurate methacrylate and the like.

Compounds of relatively high molecular weights, say about 300 to 10,000, may also be used as compounds (a), examples of which include polyester acrylate, epoxy acrylate, polyurethane acrylate and the like.

Compounds (a) may be combined with a monofunctional reactive compound so as to depress viscosity. Eligible monofunctional compounds include for example 2-ethylhexyl acrylate, 2-hydroxyethyl acrylate, 2-hydroxypropyl acrylate and the like.

Eligible electrically-conductive components (b) include particles of tin oxide and indium oxide commonly known in the art and also of compounds composed predominantly of either one or both of the two oxides. The oxides may be used in the form of metallic dopes such as antimony-doped tin oxide, stannate-doped indium oxide and the like. Components (b) should in each case have a particle size not exceeding 0.2 micrometer. Larger particle sizes would render the resulting coat susceptible to scattered visible ray, hence reduced transparency.

The amount of component (b) to be added should be in the range of 40 to 80%, preferably 55 to 70% by weight of the total composition. The component if smaller amounts than 40% would lead to increased surface resistance, resulting in reduced destaticization, and if larger amounts than 80% would adversely affect transparency, abrasion resistance and adhesive strength.

According to an important aspect of the invention, components (b) should be carried or coated with a hydrolyzed silicon compound of an organic type of the formula $$R_m^1 R_n^2 Si(OR^3)_{4-(m+n)}$$

where $R^1$ and $R^2$ each are a hydrocarbon moiety of 1 to 20 carbon atoms or an organic group containing a halogen atom or an epoxy, acrylonitrile, methacrylonitrile, mercapto or amino group, each of the hydrocarbon moiety and organic group forming a Si-C bond, $R^3$ is a hydrocarbon moiety of 1 to 6 carbon atoms or an oxygen-containing hydrocarbon moiety, m and n each are 0, 1 or 2, and the sum of m and n is 1 or 2. Eligible silicon compounds include for example trialkoxy and triacyloxy silanes such as methyltrimethoxysilane, methytriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxysilane, phenyltrimethoxysilane, phenyltriethoxysilane, phenyltriacetoxysilane, gamma-chloropropyltrimethoxysilane, gamma-chloropropyltriethoxysilane, gamma-chloropropyltriacetoxysilane, 3,3,3-trichloropropyltrimethoxysilane, gamma-glycidoxypropyltrimethoxysilane, gamma-glycidoxypropyltriethoxysilane, gamma-(beta-glycidoxyethoxy)propyltrimethoxysilane, beta-(3,4-epoxycyclohexyl)ethyltrimethoxysilane, beta-(3,4-epoxycyclohexyl)ethyltriethoxysilane, gamma-methacryloxypropyltrimethoxysilane, gamma-aminopropyltrimethoxysilane, gamma-aminopropyltriethoxysilane, gamma-mercaptopropyltrimethoxysilane, N-beta-(aminoethyl)-gamma-aminopropyltriethoxysilane, beta-cyanoethyltriethoxysilane and the like, and alkoxy and diacyloxy silanes such as methyldimethoxysilane, phenylmethyldimethoxysilane, dimethyldiethoxysilane, gamma-glycidoxypropylmethyldiethoxysilane, gamma-glycidoxypropylmethyldiethoxysilane, gamma-chloropropylmethyldimethoxysilane, gamma-chloropropylmethyldiethoxysilane, gamma-methacyloxypropylmethyldimethoxysilane, gamma-methacryloxypropylmethyldiethoxysilane, gamma-mercaptopropylmethyldimethoxysilane, gamma-mercaptopropylmethyldiethoxysilane, gamma-aminopropylmethyldimethoxysilane, gamma-aminopropylmethyldiethoxysilane, methylvinyldiethoxysilane and the like. These compounds may be used alone or in combination.

Particularly preferred among the above silicon compounds are compounds having C—C double bonds at either one of the R¹ and R² substituents.

Components (b) used herein may be obtained by dispersing and hydrolyzing a given silicon compound in water to thereby give a hydrolyzate containing a —Si—OH— or —Si—O—Si— linkage, and then by adding a predetermined comminuted metallic oxide to the hydrolyzate, followed by dispersion with stirring and by subsequent evaporation of water, providing metallic oxide particles having such silicon compound carried or coated thereon. Hydrolysis allows a silicon compound to be partly chemically attached onto the metallic oxide.

The amount of the silicon compound to be used should be in the range of 5 to 40 parts, preferably 10 to 35 parts by weight based on 100 parts by weight of component (b). Smaller amounts than 5 parts would be ineffective for improving transparency, abrasion resistance add adhesiveness, whereas larger amounts than 40 parts would make the coating objectionably electrically surface-resistant and hence insufficiently antistatic.

Photosensitizers may also be employed to improve ultraviolet curing. Eligible photosensitizers include for examples ketals such as benzyldimethyl ketal and the like, benzoins such as benzyldimethyl ether, benzoinethyl ether, benzoin-1-propyl ether, benzoin, alpha-methylbenzoin and the like, anthraquinones such as 9,10-anthraquinone, 1-chloroanthraquinone, 2-chloroanthraquinone, 2-ethylanthraquinone and the like, benzophenones such as benzophenone, p-chlorobenzophenone, p-dimethylaminobenzophenone and the like, propiophenones such as 2-hydroxy-2-methylpropiophenone, 1-(4-isopropylphenone)-2-hydroxy-2-methylpropiophenone and the like, suberones such as dibenzosuberone and the like, sulfur-containing compounds such as diphenyl disulfide, tetramethylthiuram disulfide, thioxanthone and the like, dyes such as methylene blue, eosine, fluorescein and the like, and combinations thereof. The photosensitizer ranges in amount from 0.1 to 10% by weight of the total composition.

The composition of the invention may be produced for example by combining a starting compound with component (b) an if necessary with an organic solvent, and subsequently by kneading the admixture on a three-roll mill, a sand mill or a ball mill. Such composition may be applied onto a substrate as by spraying, dipping, roll coating or spinnering. Examples of the substrate include sheets and films of polycarbonate, acrylic resin, polyethylene terephthalate, polyvinyl chloride and the like. The coating on removal of the solvent at room temperature or with heat is curable by irradiation of with ultraviolet light or an electron beam.

The following examples are given to further illustrate the present invention, but should not be construed as limiting the invention.

Synthesis of Electrically Conductive Components (a) γ-Acryloxypropyltrimethoxysilane 200 g was dispersed with stirring in 4 liters of water of pH 4.2 for one hour. Particulate antimony trioxide-doped tin oxide 800 g (Mitsubishi Metal Corp., Japan) was then added with stirring for 20 minutes on a homogenizer equipped with a high-speed stirrer (Ntro Atomizer, Denmark). The resulting dispersion was dried at a feed of about one liter per hour by a spray drier (Tokushu Kakoki Kogyo K. K., Japan). There was obtained a particulate conductive component (I).

(b) The procedure of synthesis (a) above was followed except that vinyltrimethylsilane 100 g and stannate-doped indium oxide 900 g were used, thereby giving a conductive component (II).

EXAMPLE 1

A mixture of 1,6-hexanediol diacrylate 34 g, epoxy acrylate 66 g (Ripoxy SP-1509, Showa Highpolymer Co., Ltd., Japan), component (I) 200 g and benzyldimethyl ketal 6 g was kneaded on a three-roll mill. The resulting admixture 100 g was combined with stirring with a solvent 100 g consisting of ethyl acetate 30 phr and n-butyl alcohol 70 phr to thereby provide a curable composition according to the invention.

The composition was spinner-coated onto a polycarbonate plate (Mitsubishi Gas Chemical Co., Inc., Japan) and dried at 50° C. for 10 minutes. The plate was irradiated from a distance of 10 cm for 10 seconds by a 120 W/cm high-pressure mercury lamp, after which a 5 μm thick coat was formed.

EXAMPLE 2

Pentaerythritol triacrylate 50 g, urethane acrylate oligomer 50 g (Ebecryl Eb-220, UCB, France), component (II) 150 g and benzyldimethyl ketal 6 g were kneaded on a three-roll mill. The mixture 100 g was added with stirring with a solvent 100 g consisting of ethyl acetate 30 phr, ethyl alcohol 25 phr and t-butyl alcohol 45 phr, providing a curable composition.

The composition was treated in a manner similar to Example 1 to form a 5 μm thick coat.

COMPARATIVE EXAMPLE 1

The procedure of Example 1 was followed except for the use of tin oxide not treated as in synthesis (a), giving a 5 μm thick coat.

COMPARATIVE EXAMPLE 2

The procedure of Example 2 was followed except that tin oxide free from treatment of synthesis (b) was used. There was obtained a 5 μm thick coat.

All the coats provided in the above examples were examined for surface electrical resistance, haze, haze after Taber abrasion and adhesiveness with the results tabulated.

It should be noted that the coats according to the invention are highly satisfactory in respect of all the physical characteristics tested.

TABLE

| run | surface electrical resistance (Ω) | haze (%) | haze after Taber abrasion (%) | adhesiveness |
| --- | --- | --- | --- | --- |
| Example 1 | $9 \times 10^8$ | 0.6 | 8.4 | 100/100 |
| Example 2 | $6 \times 10^8$ | 1.1 | 7.8 | 100/100 |
| Comparative Example 1 | $8 \times 10^7$ | 13 | 38 | 0/100 |
| Comparative Example 2 | $5 \times 10^7$ | 15 | 35 | 0/100 | surface electrical resistance: ASTM D-257
haze: ASTM D-1003
Taber abrasion: ASTM D-1004 CSIO, 500 g × 2, 100 rpm
adhesiveness: JIS K-5400, crosshatch test with tape

What is claimed is:

1. A curable composition comprising:
   (a) a base compound having in the molecule at least two acryloyl or methacryloyl groups; and
   (b) an electrically-conductive particulate component selected from the group consisting of tin oxide, indium oxide, antimony-doped tin oxide and stannate-doped indium oxide, said particulate component having a particle size of not more than 0.2 micrometer, and having carried thereon a hydrolyzed silicon compound of the formula $$R_m^1 R_n^2 Si(OR^3)_{4-(m+n)}$$

where $R^1$ and $R^2$ each are a hydrocarbon moiety of 1 to 20 carbon atoms or an organic group containing a halogen atom or an epoxy, acrylonitrile, methacrylonitrile, mercapto or amino group, each of the hydrocarbon moiety and organic group forming a Si—C bond, $R^3$ is a hydrocarbon moiety of 1 to 6 carbon atoms or an oxygen-containing hydrocarbon moiety, m and n each are 0, 1, or 2, and the sum of m and n is 1 or 2, said particulate component being present in an amount of 40 to 80 percent by weight of the total composition, said silicon compound being present in an amount of 5 to 40 parts by weight per 100 parts by weight of said particulate component.

2. The composition of claim 1, wherein said base compound is selected from the group consisting of ethyleneglycol diacrylate, propyleneglycol diacrylate, propylneglycol dimethacrylate, tetraethyleneglycol dimethacrylate, trimethylolpropane triacrylate, trimethylolpropane trimethacrylate, glycerol triacrylate, glycerol trimethacrylate, pentaerythritol triacrylate, pentaerythritol trimethacrylate, tris(2-hydroxyethyl)isocyanurate acrylate, tris(2-hydroxyethyl)isocyanurate methacrylate, polyester acrylate, epoxy acrylate and polyurethane acrylate.

3. The composition of claim 1, said base compound further including one member selected from the group consisting of 2-ethylhexyl acrylate, 2-hydroxyethyl acrylate and 2-hydroxypropyl arylate in an amount sufficient to depress viscosity.

4. The composition of claim 1, wherein said silicon compound is selected from the group consisting of methyltrimethoxysilane, methytriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxysilane, phenyltrimethoxysilane, phenyltriethoxysilane, phenyltriacetoxysilane, gamma-chloropropyltrimethoxysilane, gamma-chloropropyltriethoxysilane, gamma-chloropropyltriacetoxysilane, 3,3,3-trichloropropyltrimethoxysilane, gamma-glycidoxypropyltrimethoxysilane, gamma-glycidoxypropyltriethoxysilane, gamma-(beta-glycidoxyethoxy)propyltrimethoxysilane, beta-(3,4-epoxycyclohexyl)ethyltrimethoxysilane, beta-(3,4-epoxycyclohexyl)ethyltriethoxysilane, gamma-methacryloxypropyltrimethoxysilane, gamma-aminopropyltrimethoxysilane, gamma-aminopropyltriethoxysilane, gamma-mercaptopropyltrimethoxysilane, N-beta-(aminoethyl)-gamma-aminopropyltriethoxysilane, beta-cyanoethyltriethoxysilane, methyldimethoxysilane, phenylmethyldimethoxysilane, dimethyldiethoxysilane, gamma-glycidoxypropylmethyldiethoxysilane, gamma-glycidoxypropylmethyldiethoxysilane, gamma-chloropropylmethyldimethoxssilane, gamma-chloropropylmethyldiethoxysilane, gamma-methacyloxypropylmethyldimethoxysilane, gamma-methacryloxypropylmethyldiethoxysilane, gamma-mercaptopropylmethyldimethoxysilane, gamma-mercaptopropylmethyldiethoxysilane, gamma-aminopropylmethyldimethoxysilane, gamma-aminopropylmethyldiethoxysilane, methylvinyldiethoxysilane and combinations thereof.

5. The composition of claim 1, further including a photosensitizer in an amount of 0.1 to 10 percent by weight of the total composition.

6. The composition of claim 5, wherein said photosensitizer is selected from the group consisting of benzyldimethyl ketal, benzyldimethyl ether, benzoinethyl ether, benzoin-1-propyl ether, benzoin, alphamethylbenzoin, 9,10-anthraquinone, 1-chloro-anthraquinone, 2-chloroanthraquinone, 2-ethylanthraquinone, benzophenone, p-chlorobenzophenone, p-dimethylaminobenzophenone, 2-hydroxy-2-methylpropiophenone, 1-(4-isopropylphenone)-2-hydroxy-2 methylpropiophenone, dibenzosuberone, diphenyl disulfide, tetramethyl thiuram disulfide, thioxanthone, methylene blue, eosine, fluorescein and combinations thereof.

7. The composition of claim 1, wherein said electrically-conductive component is tin oxide.

8. The composition of claim 1, wherein said electrically-conductive component is indium oxide.

9. The composition of claim 1, wherein said electrically-conductive component is stannate-doped indium oxide.

10. The composition of claim 1, wherein said electrically-conductive component is antimony-doped tin oxide.

* * * * *